US010294144B2

(12) United States Patent
Nagashima et al.

(10) Patent No.: US 10,294,144 B2
(45) Date of Patent: May 21, 2019

(54) OPTICAL GLASS

(71) Applicant: AGC Inc., Chiyoda-ku (JP)

(72) Inventors: Tatsuo Nagashima, Chiyoda-ku (JP); Hiroyasu Miyazawa, Chiyoda-ku (JP); Kenji Kitaoka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/979,793

(22) Filed: May 15, 2018

(65) Prior Publication Data

US 2018/0257977 A1 Sep. 13, 2018

Related U.S. Application Data

(63) Continuation of application No. PCT/JP2016/083351, filed on Nov. 10, 2016.

(30) Foreign Application Priority Data

Nov. 20, 2015 (JP) ................................ 2015-227735

(51) Int. Cl.

| | |
|---|---|
| ***C03C 3/32*** | (2006.01) |
| ***C03C 4/10*** | (2006.01) |
| ***G02B 1/00*** | (2006.01) |
| *G01J 5/08* | (2006.01) |

(52) U.S. Cl.

CPC ................ *C03C 3/323* (2013.01); *C03C 3/32* (2013.01); *C03C 3/321* (2013.01); *C03C 4/10* (2013.01); *G02B 1/00* (2013.01); *G01J 5/0875* (2013.01)

(58) Field of Classification Search

CPC ............ C03C 3/321; C03C 3/323; C03C 4/10

See application file for complete search history.

(56) References Cited

U.S. PATENT DOCUMENTS

| | | | | |
|---|---|---|---|---|
| 4,188,089 A * | 2/1980 | Gliemeroth | C03B 37/01807 | 385/124 |
| 2003/0118315 A1* | 6/2003 | Hewak | C03B 37/023 | 385/142 |
| 2009/0142669 A1* | 6/2009 | Shinohara | C03B 5/06 | 429/320 |
| 2010/0285946 A1 | 11/2010 | Tani et al. | | |
| 2015/0196898 A1* | 7/2015 | Zhang | C03C 4/00 | 502/215 |
| 2016/0311719 A1 | 10/2016 | Yamada et al. | | |

FOREIGN PATENT DOCUMENTS

| | | |
|---|---|---|
| DE | 26 48 702 A1 | 5/1978 |
| EP | 2 226 304 A1 | 9/2010 |
| EP | 3 093 275 A1 | 11/2016 |
| FR | 2 369 224 | 5/1978 |
| GB | 1 535 640 | 12/1978 |
| JP | 53-083639 | 7/1978 |
| JP | 62-072554 | 4/1987 |
| JP | 05-004835 | 1/1993 |
| JP | 05-085769 | 4/1993 |
| JP | 06-191861 | 7/1994 |
| JP | 2009-161374 | 7/2009 |
| JP | 2015-129072 | 7/2015 |
| WO | WO 2009/084619 A1 | 7/2009 |
| WO | WO 2015/104958 A1 | 7/2015 |

OTHER PUBLICATIONS

International Search Report dated Jan. 17, 2017 in PCT/JP2016/083351 filed on Nov. 10, 2016 (with English Translation).

Written Opinion dated Jan. 17, 2017 in PCT/JP2016/083351 filed on Nov. 10, 2016.

* cited by examiner

*Primary Examiner* — Elizabeth A. Bolden

(74) *Attorney, Agent, or Firm* — Oblon, McClelland, Maier & Neustadt, L.L.P.

(57) ABSTRACT

There is provided an optical glass having high infrared transmittance and being useful as an on-vehicle infrared sensor and the like. An optical glass including, in expression of atomic %: Ge+Ga; 6% to 30%; S+Se+Te; 50% to 85%; and Ti; 0.001% to 0.5%, wherein a wavelength ($\lambda_{T10\%}$) at a long-wavelength side end in which infrared transmittance in a glass plate of the optical glass converted to a thickness of 1 mm becomes 10% is 12 μm or more.

8 Claims, 1 Drawing Sheet

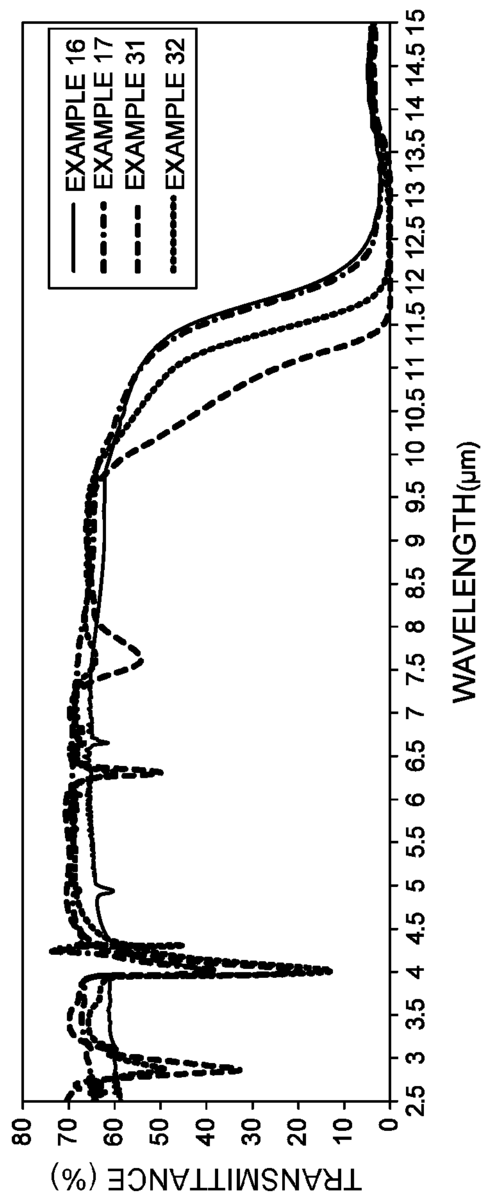
EXAMPLE 16
EXAMPLE 17
EXAMPLE 31
EXAMPLE 32
TRANSMITTANCE (%)
WAVELENGTH(μm)
80 70 60 50 40 30 20 10 0
2.5 3 3.5 4 4.5 5 5.5 6 6.5 7 7.5 8 8.5 9 9.5 10 10.5 11 11.5 12 12.5 13 13.5 14 14.5 15

OPTICAL GLASS

CROSS-REFERENCE TO RELATED APPLICATIONS

This application is a continuation of prior International Application No. PCT/JP2016/083351, filed on Nov. 10, 2016 which is based upon and claims the benefit of priority from Japanese Patent Application No. 2015-227735, filed on Nov. 20, 2015; the entire contents of all of which are incorporated herein by reference.

TECHNICAL FIELD

The present invention relates to an optical glass, and in particular relates to an optical glass which is used for an infrared sensor or the like and is excellent in an infrared transmission property.

BACKGROUND

In recent years, from an increase in awareness and a social demand of safety and ease of mind, and the like, a degree of attention to an infrared sensor detecting infrared rays emitted by a living body is increasing. The infrared rays are classified, depending on a wavelength band thereof and uses, into near-infrared rays (for example wavelengths of 0.7 μm to 2 μm), mid-infrared rays (for example, wavelengths of 3 μm to 5 μm), and far-infrared rays (for example, wavelengths of 8 μm to 13 μm), and there can be cited, as the uses, a touch sensor and a near-infrared camera in the near-infrared ray, a gas analysis and a mid-infrared spectroscopic analysis (functional group analysis) in the mid-infrared ray, a nightvision, a thermoviewer, and the like in the far-infrared ray.

For the infrared sensor, depending on the uses, optical devices such as an optical filter, an optical window, a lens to condense infrared rays, and a polarizing device for removing reflected light are provided in front thereof. As materials for such optical devices, conventionally, infrared transmitting materials such as germanium (Ge), silicon, zinc sulfide (ZnS), selenium sulfide, and a halide are being used.

However, because Ge, silicon, ZnS, and selenium sulfide are crystals, they are poor in processability and difficult to process into a complex shape such as an aspherical lens. Therefore, there have been problems of difficulty in mass production and further difficulty in miniaturization of the infrared sensor. In addition, the halide is poor in environmental resistance and undergoes a remarkable reduction in a transmitting property due to moisture, and therefore it has been unsuitable for the nightvision for external use such as on-vehicle and monitoring uses.

Thus, as an infrared transmitting material which has no problem of the environmental resistance, and is processed relatively easily and also allows aspherical lens processing by press molding, chalcogenide glass containing a chalcogen element as a main component is proposed (for example, refer to Patent References 1 to 4 (JP-A No. H06-191861, JP-A No. H05-85769, JP-A No. 2009-161374 and JP-A No. 2015-129072).).

SUMMARY

However, because the chalcogenide glass mentioned in Patent Reference 1 contains As having an environmental load, handling and management of the raw material and treatment for sludge and waste liquid to be discharged at a time of processing become costly. Moreover, due to future restriction extension, there has been a possibility of a further increase in the cost of treatment and recovery.

As chalcogenide glass not containing As, although Ge—Sb—S-based glass is proposed (Patent References 2 to 4), the glass has a low light-transmitting property in a far-infrared region and is not suitable for uses for a nightvision, a thermoviewer, and the like.

Further, in glass having Ge and a chalcogen element as a main component, infrared absorption caused by a stretching vibration of bonding (Ge—O) of oxygen which is contained as an impurity to Ge which is a structural component of the glass is in the vicinity of wavelengths of 11.1 to 13.0 μm, and infrared absorption caused by bonding (H—O) of oxygen to hydrogen of water is in the vicinity of a wavelength of 10.7 μm. Therefore, when even a very small amount of oxygen and hydrogen (hydrogen atoms constituting water) exists in the glass, infrared rays with wavelengths of 8 to 12 μm which are emitted from a living body are not transmitted efficiently, and therefore it has been difficult that infrared sensors using the chalcogenide glass mentioned in Patent References 2 to 4 sufficiently enhance sensitivity for biological detection.

As a method of removing the infrared absorption caused by the above-described impurity, Patent Reference 5 (JP-A No. S62-72554) discloses a method of adding Mg in the glass. Further, Patent Reference 6 (JP-A No. H05-4835) discloses a method of adding C in the glass and suppressing the absorption caused by oxygen in the glass. However, these methods have made it possible to suppress the infrared absorption caused by oxygen as the impurity, but have not made it possible to suppress the infrared absorption caused by hydrogen.

The present invention has been made in order to solve such problems as described above, and it is an object to provide an optical glass having high transmittance in a near-infrared to far-infrared region.

The present inventors have conducted a keen study in order to solve the above-described problems, and as a result, they have found that adding Ti in the glass makes it possible to suppress the above-described absorption of infrared rays caused by oxygen and hydrogen, and have reached completion of the present invention.

In the present invention, a total amount of Ge and Ga is indicated as Ge+Ga, a total amount of S, Se, and Te is indicated as S+Se+Te, a total amount of Li, Na, K, and Cs is indicated as Li+Na+K+Cs, a total amount of F, Cl, Br, and I is indicated as F+Cl+Br+I, and a total amount of S and Te is indicated as S+Te.

An optical glass of the present invention includes, in expression of atomic %: Ge+Ga; 6% to 30%; S+Se+Te; 50% to 85%; and Ti; 0.001% to 0.5%, and the optical glass has a wavelength ($\lambda_{T10\%}$) at a long-wavelength side end in which infrared transmittance in a glass plate of the optical glass converted to a thickness of 1 mm becomes 10% of 12 μm or more.

The optical glass of the present invention preferably does not substantially contain As.

Further the optical glass of the present invention, preferably contains, in expression of atomic %:

Ge+Ga; 7% to 25%;
Sb; 0% to 35%;
Bi; 0% to 20%;
Zn; 0% to 20%;
Sn; 0% to 20%;
Si; 0% to 20%;
La; 0% to 20%;

S+Se+Te; 55% to 80%;

Ti; 0.005% to 0.3%;

Li+Na+K+Cs; 0% to 20%; and

F+Cl+Br+I; 0% to 20%, and the optical glass preferably has a glass transition point (Tg) of 140° C. to 550° C.

Further, the optical glass of the present invention, preferably contains, in expression of atomic %:

Ge+Ga; 7% to 25%;

Sb; 0% to 35%;

Bi; 0% to 20%;

In; 0% to 20%;

Zn; 0% to 20%;

Sn; 0% to 20%;

Si; 0% to 20%;

La; 0% to 20%;

Y; 0% to 10%;

Gd; 0% to 10%;

Ca; 0% to 20%;

Sr; 0% to 20%;

Ba; 0% to 20%;

S+Se+Te; 55% to 80%;

Ti; 0.005% to 0.3%;

Li+Na+K+Cs; 0% to 20%; and

F+Cl+Br+I; 0% to 20%, and the optical glass preferably has a glass transition point (Tg) of 140° C. to 550° C. Then, the optical glass of the present invention preferably does not substantially contain Se.

Further, the optical glass of the present invention, preferably contains, in expression of atomic %:

Ge+Ga; 8% to 23%;

Sb; 2% to 32%;

Bi; 0% to 10%;

In; 0% to 10%;

Zn; 0% to 15%;

Sn; 0% to 15%;

Si; 0% to 15%;

La; 0% to 15%;

Y; 0% to 8%;

Gd; 0% to 8%;

Ca; 0% to 15%;

Sr; 0% to 15%;

Ba; 0% to 15%;

S; 55% to 75%;

Te; 0% to 20%;

S+Te; 55% to 75%;

Ti; 0.01% to 0.2%;

Li+Na+K+Cs; 0% to 10%; and

F+Cl+Br+I; 0% to 10%, and contains

C; 0.001% to 0.2%.

An optical element of the present invention uses the optical glass of the present invention.

Further, an infrared sensor of the present invention uses the optical element of the present invention.

According to the present invention, an optical glass in which there is no absorption based on oxygen and hydrogen which are impurities in a wide near-infrared to far-infrared region, and which is excellent in an infrared transmission property can be obtained. Therefore, the optical glass of the present invention is suitable for an infrared sensor for an on-vehicle camera or the like.

BRIEF DESCRIPTION OF THE DRAWING

FIG. 1 is a graph illustrating infrared transmission spectrums of the respective samples in examples 16, 17, 31, and 32.

DETAILED DESCRIPTION

Hereinafter, an embodiment of an optical glass of the present invention will be explained.

An optical glass of the present invention contains, in expression of atomic %: 6% to 30% of Ge+Ga; 50% to 85% of S+Se+Te; and 0.001% to 0.5% of Ti. Then, in the optical glass of the present invention, in an infrared spectrum measured in a plate-shaped body with a thickness of 1 mm, a wavelength (hereinafter, indicated as $\lambda_{T10\%}$) at a long-wavelength side end in which transmittance becomes 10% is 12 μm or more.

The above-described $\lambda_{T10\%}$ is used as an index for evaluating light transmittance in an infrared region. The optical glass of the present invention contains 6% to 30% of Ge+Ga, 50% to 85% of S+Se+Te, and 0.001% to 0.5% of Ti respectively, and has $\lambda_{T10\%}$ of 12 μm or more. The optical glass of the present invention has high infrared transmittance in a wide near-infrared to far-infrared wavelength region due to the above-described composition and characteristic. In particular, because $\lambda_{T10\%}$ which is the wavelength at the long-wavelength side end in an infrared transmission region is 12 μm or more, high transmittance can be revealed up to a far-infrared long-wavelength side. $\lambda_{T10\%}$ of the optical glass of the present invention is preferably 12.5 μm or more, more preferably 13 μm or more, further preferably 14 μm or more, and particularly preferably 15 μm or more.

The optical glass of the present invention may contain elements other than Ge and Ga, chalcogen elements (S, Se and Te), and Ti in a range where the purpose of the present invention is not impaired.

A preferable composition of the optical glass of the present invention will be indicated below.

That is, the preferable composition of the optical glass of the present invention is a composition containing, in expression of atomic %:

Ge+Ga; 7% to 25%;

Sb; 0% to 35%;

Bi; 0% to 20%;

Zn; 0% to 20%;

Sn; 0% to 20%;

Si; 0% to 20%;

La; 0% to 20%;

S+Se+Te; 55% to 80%;

Ti; 0.005% to 0.3%;

Li+Na+K+Cs; 0% to 20%; and

F+Cl+Br+I; 0% to 20%.

Then, this glass preferably has a glass transition point (Tg) of 140° C. to 550° C.

In the optical glass of the present invention, having Tg of 140° C. to 550° C. causes no characteristic deterioration even though a use environment becomes high-temperature, and makes workability in molding (for example, press molding) good. Tg is preferably 170° C. or higher, more preferably 200° C. or higher, and further preferably 250° C. or higher. Further, Tg is preferably 500° C. or lower. Tg can be measured by a differential thermal analyzer, for example.

A more preferable composition of the optical glass of the present invention is a composition containing, in expression of atomic %:

Ge+Ga; 7% to 25%;
Sb; 0% to 35%;
Bi; 0% to 20%;
In; 0% to 20%;
Zn; 0% to 20%;
Sn; 0% to 20%;
Si; 0% to 20%;
La; 0% to 20%;
Y; 0% to 10%;
Gd; 0% to 10%;
Ca; 0% to 20%;
Sr; 0% to 20%;
Ba; 0% to 20%;
S+Se+Te; 55% to 80%;
Ti; 0.005% to 0.3%;
Li+Na+K+Cs; 0% to 20%; and
F+Cl+Br+I; 0% to 20%.

Then, similarly to the above, this glass also preferably has a glass transition point (Tg) of 140° C. to 550° C.

A further preferable composition of the optical glass of the present invention is a composition containing, in expression of atomic %:

Ge+Ga; 8% to 23%;
Sb; 2% to 32%;
Bi; 0% to 10%;
In; 0% to 10%;
Zn; 0% to 15%;
Sn; 0% to 15%;
Si; 0% to 15%;
La; 0% to 15%;
Y; 0% to 8%;
Gd; 0% to 8%;
Ca; 0% to 15%;
Sr; 0% to 15%;
Ba; 0% to 15%;
S; 55% to 75%;
Te; 0% to 20%;
S+Te; 55% to 75%;
Ti; 0.01% to 0.2%;
Li+Na+K+Cs; 0% to 10%; and
F+Cl+Br+I; 0% to 10%, and containing
C; 0.001% to 0.2%.

Hereinafter, each of components to be contained in the optical glass of the present invention will be explained in detail. In this description, a content ratio of each of the components is expressed in atomic % (atomic reference concentration) with respect to the total amount of the glass unless otherwise specified.

Ge and Ga are components which form a skeletal structure of the glass and contribute to weather resistance improvement, and are essential components. Ge+Ga is 6% to 30%. Setting Ge+Ga to 6% or more allows vitrification and makes it possible to improve weather resistance of the glass. Ge+Ga is preferably 7% or more, more preferably 8% or more, and further preferably 10% or more. Further, it is preferably 25% or less, more preferably 23% or less, and further preferably 20% or less.

In particular, Ge contributes to stability improvement in the glass, improves mechanical strength, and increases Tg. A content ratio of Ge is 0% to 30%. Setting the content ratio of Ge to 30% or less makes it possible to restrain an increase in infrared absorption caused by Ge—O and suppress a rise in melting temperature of the glass and further restrain an increase in raw material costs. The content ratio of Ge is preferably 3% or more and more preferably 5% or more. Further, it is preferably 25% or less, more preferably 23% or less, and further preferably 20% or less.

Ga improves meltability of the glass and shifts an absorption edge in an infrared transmission spectrum to a long-wavelength side. A content ratio of Ga is 0% to 30%. When the content ratio of Ga exceeds 30%, the glass becomes unstable. The content ratio of Ga is preferably 1% or more. Further, it is preferably 20% or less, more preferably 15% or less, and further preferably 10% or less.

S, Se, and Te which are chalcogen elements are components which form the skeletal structure of the glass. S+Se+Te is 50% to 85%. S+Se+Te being 50% or more allows vitrification. S+Se+Te is preferably 55% or more, more preferably 58% or more, and particularly preferably 60% or more.

In addition, S, Se, and Te lower the weather resistance and Tg of the glass and decrease the mechanical strength, and when S+Se+Te is set to 85% or less, the lowering of the weather resistance and Tg of the glass and the decrease in the mechanical strength are restrained and the weather resistance and the mechanical strength are good, which makes it possible to obtain the glass having Tg in the above-described range (140° C. to 550° C.). Furthermore, when S+Se+Te is more than 85%, there is a possibility that a vapor pressure rise at a time of melting makes production of the glass difficult, but setting S+Se+Te to 85% or less makes it possible to restrain the vapor pressure rise and produce the glass. S+Se+Te is preferably 80% or less, more preferably 75% or less, and particularly preferably 72% or less.

Here, Se among the above-described chalcogen elements operates to shift the infrared transmission spectrum of the glass to the long-wavelength side, but has an environmental load, and therefore, its content ratio is preferably 1% or less and more preferably 0.5% or less, and particularly preferably is not substantially contained. Note that "not substantially contained" means that it is not intentionally contained at a time of raw material mixing, and does not mean that even mixture at an impurity level is eliminated. Specifically, it means that a content ratio of a component is less than 0.05% in atomic %.

As described above, from the viewpoint of a reduction in a load on the environment, in the chalcogen element, it is preferable that S is used alone or S and Te are used in combination. In the above case, a content ratio of S is preferably set to 55% to 75% and a content ratio of Te is preferably set to 0% to 20%, and S+Te is preferably 55% to 75%. Because Te shifts the infrared transmission spectrum of the glass to the long-wavelength side, it contributes to a rise in $\lambda_{T10\%}$ but lowers Tg, and therefore, a content ratio of Te is preferably 20% or less. Further, when the content ratio of Te is more than 20%, there is a possibility of making the glass unstable and crystallizing it. The content ratio of Te is more preferably 1% or more. Further, it is more preferably 10% or less.

Note that in order to obtain the glass which transmits light in a far-infrared region (for example, an 8 to 14 μm wavelength region) of a wavelength of more than 12 μm, as the chalcogen element, it is preferable that Se is used alone or Se and Te are used in combination. In the case, Se+Te is preferably 55% to 75%.

Ti is a component which suppresses infrared absorption caused by oxygen and hydrogen which are impurities in the glass and contributes to transmittance improvement in infrared rays, and is an essential component. A content ratio of Ti is 0.001% to 0.5%. The content ratio of Ti being 0.001% or more suppresses the absorption of infrared rays due to oxygen and hydrogen in the glass and improves the transmittance of infrared rays. The content ratio of Ti is preferably 0.002% or more, more preferably 0.005% or more, further preferably 0.01% or more, and particularly preferably 0.02% or more. Meanwhile, the content ratio of Ti being 0.5% or less makes it possible to prevent crystallization of the glass and obtain the stabilized glass. The content ratio of Ti is preferably 0.4% or less, further preferably 0.3% or less, and particularly preferably 0.2% or less.

Sb is a component which forms the skeletal structure of the glass and improves the weather resistance and the mechanical strength, and is an optional component. Because Sb has the possibility of making the glass unstable and crystallizing it, its content ratio is preferably 35% or less. When the glass contains Sb, its content ratio is preferably 2% or more, more preferably 5% or more, and further preferably 8% or more. Further, the content ratio of Sb is preferably 32% or less, more preferably 30% or less, and further preferably 25% or less.

Bi is a component which improves the weather resistance, the meltability, and a refractive index of the glass and shifts the absorption edge in the infrared transmission spectrum to the long-wavelength side, and is an optional component. However, because Bi decreases transmittance of visible light and lowers Tg, its content ratio is preferably 20% or less. When the glass contains Bi, its content ratio is preferably 0.5% or more, more preferably 1% or more, and further preferably 2% or more. Further, the content ratio of Bi is preferably 10% or less, more preferably 8% or less, and further preferably 5% or less.

In is a component which improves the weather resistance and the meltability of the glass and shifts the absorption edge in the infrared transmission spectrum to the long-wavelength side, and is an optional component. However, because In has the possibility of making the glass unstable and crystallizing it, its content ratio is preferably 20% or less. When the glass contains In, its content ratio is preferably 0.5% or more, more preferably 1% or more, and further preferably 2% or more. Further, the content ratio of In is preferably 10% or less, more preferably 8% or less, further preferably 5% or less, and even further preferably 3% or less.

Both Zn and Sn are components which improve the meltability of the glass and stabilize the glass and contribute to an adjustment of the refractive index, and are optional components. However, because Zn and Sn have the possibility of making the glass unstable and crystallizing it, content ratios of Zn and Sn are each preferably 20% or less. When the glass contains Zn or Sn, their content ratios are each preferably 0.5% or more, more preferably 1% or more, and further preferably 2% or more. Further, the content ratios of Zn and Sn are each preferably 15% or less, more preferably 10% or less, further preferably 8% or less, even further preferably 5% or less, and particularly preferably 3% or less.

Si is a component which improves the weather resistance and the mechanical strength of the glass and improves Tg and allows the adjustment of the refractive index, and is an optional component. However, when a content ratio of Si is more than 20%, there is the possibility of making the glass unstable and crystallizing it. Further, when a container made of quartz is used for the melting, there is a possibility of eroding the quartz and causing breakage, and therefore, the content ratio of Si is preferably 20% or less. When the glass contains Si, its content ratio is preferably 0.5% or more, more preferably 1% or more, and further preferably 2% or more. Further, the content ratio of Si is preferably 15% or less, more preferably 10% or less, further preferably 8% or less, even further preferably 5% or less, and particularly preferably 3% or less.

All of La, Y, and Gd are components which improve the weather resistance, Tg, and the refractive index of the glass and shift the absorption edge in the infrared transmission spectrum to the long-wavelength side, and are optional components. However, La, Y, and Gd raise the melting temperature of the glass and increase the raw material costs. Further, in each of La, Y, and Gd, when the element raw material is added to the glass, it is necessary to pay attention to storage and handling of the raw material.

When the glass contains La, its content ratio is preferably 0.5% or more, more preferably 1% or more, and further preferably 2% or more. Further, because La has the possibility of making the glass unstable and crystallizing it, the content ratio of La is preferably 20% or less, more preferably 15% or less, further preferably 10% or less, even further preferably 8% or less, further preferably 5% or less, and particularly preferably 3% or less.

When the glass contains Y or Gd, either of their content ratios is preferably 0.5% or more, more preferably 1% or more, and further preferably 2% or more. Further, because Y or Gd has the possibility of making the glass unstable and crystallizing it, either of the content ratios of Y and Gd is preferably 10% or less, more preferably 8% or less, further preferably 6% or less, even further preferably 5% or less, and particularly preferably 3% or less.

All of Ca, Sr, and Ba are components which improve the meltability of the glass and stabilize the glass and contribute to the adjustment of the refractive index, and are optional components. When the element raw material of each of Ca, Sr, and Ba is added to the glass, it is necessary to pay attention to storage and handling of the raw material. Further, when Ca, Sr, and Ba are contained excessively, there is the possibility of making the glass unstable and crystallizing it, and therefore, their content ratios are each preferably 20% or less. When the glass contains at least one of Ca, Sr, and Ba, its content ratio is preferably 0.5% or more, more preferably 1% or more, further preferably 2% or more. Further, the content ratios of Ca, Sr, and Ba are each preferably 15% or less, more preferably 10% or less, further preferably 8% or less, even further preferably 5% or less, and particularly preferably 3% or less.

All of Li, Na, K, and Cs are components which improve the meltability of the glass and allow the adjustment of the refractive index, and are optional components. However, Li, Na, K, and Cs lower the weather resistance of the glass and remarkably lower Tg. Further, when the element raw material of each of Li, Na, K, and Cs is added to the glass, it is necessary to pay attention to storage and handling of the raw material. Furthermore, when the container made of quartz is used for the melting, treatment for suppressing erosion to the quartz is necessary. Li+Na+K+Cs is preferably 20% or less. Li+Na+K+Cs is preferably 15% or less, more preferably 10% or less, further preferably 5% or less, and even further preferably 3% or less. When there is a reason for intended improvement in the meltability of the glass, it is preferable to contain 1% or more of Li+Na+K+Cs.

All of F, Cl, Br, and I are components which improve the meltability of the glass and adjust the refractive index and shift the absorption edge in the infrared transmission spectrum to the long-wavelength side, and are optional components. However, F, Cl, Br, and I lower the weather resistance of the glass and remarkably lower Tg. F+Cl+Br+I is preferably 20% or less. F+Cl+Br+I is preferably 15% or less, more preferably 10% or less, further preferably 5% or less, and even further preferably 3% or less.

Note that in the glass in which S has been selected as a main chalcogen element, when an element to be selected from F, Cl, Br, and I is contained, Cl whose ionic radius is close to that of S is preferably contained. Further, when there is a reason for intentionally shifting the absorption edge in the infrared transmission spectrum to the long-wavelength side, or the like, it is preferable to contain 1% or more of elements to be selected from F, Cl, Br, and I.

C is a component which suppresses the infrared absorption caused by oxygen which is the impurity in the glass and contributes to the transmittance improvement in infrared rays, and is an optional component. Because C has the possibility of making the glass unstable and crystallizing it, a content ratio of C is preferably 0.2% or less. When C is contained, its content ratio is preferably 0.001% or more. When the content ratio of C is less than 0.001%, the above-described suppression effect of the infrared absorption is not sufficient. The content ratio of C is more preferably 0.002% or more, further preferably 0.005% or more, and particularly preferably 0.007% or more. Further, the content ratio of C is more preferably 0.15% or less, further preferably 0.1% or less, even further preferably 0.07% or less, and particularly preferably 0.05% or less.

Note that it is preferable that the optical glass of the present invention does not substantially contain any of As, Cd, Tl, and Pb which are harmful substances. Here, "not substantially contained" means, as described above, that they are not intentionally contained at a time of the raw material mixing, and does not mean that even mixture at the impurity level is eliminated. Specifically, it means that a content ratio of a component is less than 0.05% in atomic %. The optical glass of the present invention which does not substantially contain any of As, Cd, Tl, and Pb makes it possible to restrain the load on the environment to a minimum.

A manufacturing method of the optical glass of the present invention is not particularly limited. For example, it is possible to manufacture it as indicated below. First, raw materials are mixed so as to become a composition with predetermined ranges described above in atomic %. Then, the mixed mixture is put in a container made of quartz glass, or the like and subjected to evacuation while heated, and the container is sealed by a burner while the evacuation is performed. Next, the container (ampoule) in which the raw material mixture has been sealed is heated to vitrify the contents, and thereafter the optical glass of the present invention is obtained by cooling to room temperature.

As the raw materials, element simple substances (Ge, Ga, Sb, Bi, S, Te, C, Ti, and so on) may be used, and further compound raw materials ($GeS_2$, $Sb_2S_3$, $Bi_2S_3$, $TeCl_4$, $LaF_3$, and so on) such as chalcogenides may be used. A melting temperature is preferably 700 to 1050° C. and more preferably 750 to 950° C. A melting time may be a time during which the contents are vitrified sufficiently, and is preferably 1 to 48 hours in general.

From the optical glass of the present invention manufactured as described above, for example, a glass molded body can be produced by using a molding means such as mold press molding. Then, the obtained glass molded body has high infrared transmittance, and is useful as optical devices such as an optical filter, an optical window, a lens (for example, an aspherical lens), and a polarizing element which are used for various sensor using infrared rays, and is particularly suitable as an on-vehicle nightvision and a thermoviewer.

EXAMPLES

Hereinafter, the present invention will be explained further in detail by Examples and Comparative examples, but the present invention is not limited to these Examples. In the following examples, Examples 1 to 30 are Examples of an optical glass of the present invention, and Examples 31 to 37 are Comparative examples.

Examples 1 to 37

So as to become chemical compositions (atomic %) presented in Tables 1 to 4, each of raw materials of Ge, Ga, Sb, Bi, S, Te, Sn, Zn, Si, Se, $TeCl_4$, CsCl, C, $LaF_3$, and Ti was weighed. Note that an element raw material with a purity of 99.999% was used as each of Ge, Ga, and Sb, an element raw material with a purity of 99.99% was used as each of Bi, S, Te, Zn, Si, Se, Sn, and C, a compound raw material with a purity of 99.99% was used as each of $TeCl_4$ and CsCl, a compound raw material with a purity of 99.9% was used as $LaF_3$, and an element raw material with a purity of 99.9% was used as Ti, respectively. Next, the weighed raw materials were mixed uniformly, and a quartz glass tube (inside diameter of 8 mm) which, after heating and sealing its one side with an oxyhydrogen burner, underwent IPA cleaning and was dried under reduced pressure at 600° C. was filled with the raw material mixture, and thereafter the other end of the quartz glass tube was sealed by heating with the oxyhydrogen burner while evacuation was performed at 10 to 30 Pa.

Next, the quartz glass tube (hereinafter, referred to as a raw material sealed tube.) filled with the raw material mixture and sealed was put in a melting furnace temperature-increased to 200° C. in advance, and after increasing the temperature in the furnace to 750 to 900° C. (hereinafter, referred to as a temperature $T_m$.) at a temperature increasing rate of 2° C./min, the raw material sealed tube was taken out and the raw material mixture was stirred by shaking. Then, the stirring by shaking and the putting of the raw material sealed tube into the melting furnace maintained at $T_m$ were repeated three times at 30-minute intervals. Thereafter, the raw material sealed tube was maintained at $T_m$ for 2 to 3 hours to be thereafter naturally cooled in the air, and subsequently put in an electric furnace temperature-increased to 300° C. to be slowly cooled to room temperature at a temperature decreasing rate of −0.5° C./min.

[Evaluation]

Regarding each of the above-obtained samples in the raw material sealed tubes, presence or absence of vitrification, $\lambda_{T10\%}$, a visible light transmitting property, and Tg were each measured as indicated below. Obtained measurement and evaluation results are presented at the bottoms of Table 1 to Table 4. Note that to be unmeasured is indicated with "-" in the tables. In Tables 1 to 4, "Ex" means Example.

<Presence or Absence of Vitrification>

Each of the samples was cut together with the sealed quartz glass tube to be thereafter polished, and plate-shaped samples with a thickness of 1 mm were obtained. An X-ray diffraction (XRD) spectrum of each of the obtained plate-shaped samples was measured by using an X-ray diffractometer. Then, the presence or absence of the vitrification was judged by presence or absence of a crystal peak in the XRD spectrum. Tables 1 to 4 indicated that the vitrified one was "○" and the one which was crystallized without vitrifying was "x".

<Measurement of $\lambda_{T10\%}$>

An infrared transmission spectrum of each of the above-obtained plate-shaped samples with a thickness of 1 mm was measured by using a Fourier transform infrared spectrometer (manufactured by ThermoScientific, Inc., brand name: Nicolet iS10). Then, $\lambda_{T10\%}$ was found from each of the obtained infrared transmission spectrums.

Note that FIG. 1 illustrates the infrared transmission spectrums in Examples 16 and 17 which are Examples and the infrared transmission spectrums in Examples 31 and 32 which are Comparative examples respectively.

<Visible Light Transmitting Property>

The visible light transmitting property of each of the above-obtained plate-shaped samples with a thickness of 1 mm was measured by a spectrophotometer (manufactured by PerkinElmer, Inc., brand name: Lambda 950) to be evaluated. Tables 1 to 4 indicated that the one in which a maximum value of transmittance was 50% or more was "$T_H$" and further the one in which it was less than 50% was "$T_L$" in a wavelength region of wavelengths of 350 to 700 nm.

As long as the glass transmits visible light, in incorporating it into an optical system as a far-infrared device, there is no need to perform an operation of optical axis alignment or the like using invisible infrared rays. Therefore, expensive equipment for optical axis adjustment and a complicated operation can be avoided, and assembling and adjustment costs can be reduced. From such a viewpoint, the maximum value of transmittance of visible light is preferably 50% or more.

<Measurement of Tg>

The glass obtained from a spot different from that in each of the above-described plate-shaped samples was pulverized, and Tg of the obtained glass powder was measured by using a differential thermal analyzer (manufactured by Rigaku Corporation, brand name: TG8110).

TABLE 1

| | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| Ga | 0.0 | 0.0 | 0.0 | 3.0 | 3.0 | 6.0 | 3.0 | 0.0 | 0.0 | 3.0 |
| Ge | 15.0 | 15.0 | 15.0 | 12.0 | 12.0 | 9.0 | 12.0 | 12.5 | 17.5 | 12.0 |
| Sb | 15.0 | 30.0 | 15.0 | 15.0 | 15.0 | 15.0 | 12.0 | 10.0 | 10.0 | 15.0 |
| Bi | 0.0 | 0.0 | 0.0 | 0.0 | 0.0 | 0.0 | 3.0 | 0.0 | 0.0 | 0.0 |
| In | 0.0 | 0.0 | 0.0 | 0.0 | 0.0 | 0.0 | 0.0 | 0.0 | 0.0 | 0.0 |
| Zn | 0.0 | 0.0 | 0.0 | 0.0 | 0.0 | 0.0 | 0.0 | 0.0 | 0.0 | 0.0 |
| Sn | 0.0 | 0.0 | 0.0 | 0.0 | 0.0 | 0.0 | 0.0 | 0.0 | 0.0 | 0.0 |
| Si | 0.0 | 0.0 | 0.0 | 0.0 | 0.0 | 0.0 | 0.0 | 0.0 | 0.0 | 0.0 |
| La | 0.0 | 0.0 | 0.0 | 0.0 | 0.0 | 0.0 | 0.0 | 0.0 | 0.0 | 1.0 |
| Y | 0.0 | 0.0 | 0.0 | 0.0 | 0.0 | 0.0 | 0.0 | 0.0 | 0.0 | 0.0 |
| Gd | 0.0 | 0.0 | 0.0 | 0.0 | 0.0 | 0.0 | 0.0 | 0.0 | 0.0 | 0.0 |
| Ca | 0.0 | 0.0 | 0.0 | 0.0 | 0.0 | 0.0 | 0.0 | 0.0 | 0.0 | 0.0 |
| Sr | 0.0 | 0.0 | 0.0 | 0.0 | 0.0 | 0.0 | 0.0 | 0.0 | 0.0 | 0.0 |
| Ba | 0.0 | 0.0 | 0.0 | 0.0 | 0.0 | 0.0 | 0.0 | 0.0 | 0.0 | 0.0 |
| Li | 0.0 | 0.0 | 0.0 | 0.0 | 0.0 | 0.0 | 0.0 | 0.0 | 0.0 | 0.0 |
| Na | 0.0 | 0.0 | 0.0 | 0.0 | 0.0 | 0.0 | 0.0 | 0.0 | 0.0 | 0.0 |
| K | 0.0 | 0.0 | 0.0 | 0.0 | 0.0 | 0.0 | 0.0 | 0.0 | 0.0 | 0.0 |
| Cs | 0.0 | 0.0 | 0.0 | 0.0 | 0.0 | 0.0 | 0.0 | 0.0 | 0.0 | 0.0 |
| S | 69.9 | 54.9 | 64.9 | 64.9 | 69.9 | 69.9 | 69.9 | 64.9 | 59.9 | 65.9 |
| Se | 0.0 | 0.0 | 0.0 | 0.0 | 0.0 | 0.0 | 0.0 | 0.0 | 0.0 | 0.0 |
| Te | 0.0 | 0.0 | 5.0 | 5.0 | 0.0 | 0.0 | 0.0 | 2.5 | 2.5 | 0.0 |
| F | 0.0 | 0.0 | 0.0 | 0.0 | 0.0 | 0.0 | 0.0 | 0.0 | 0.0 | 3.0 |
| Cl | 0.0 | 0.0 | 0.0 | 0.0 | 0.0 | 0.0 | 0.0 | 10.0 | 10.0 | 0.0 |
| Br | 0.0 | 0.0 | 0.0 | 0.0 | 0.0 | 0.0 | 0.0 | 0.0 | 0.0 | 0.0 |
| I | 0.0 | 0.0 | 0.0 | 0.0 | 0.0 | 0.0 | 0.0 | 0.0 | 0.0 | 0.0 |
| Ti | 0.022 | 0.027 | 0.024 | 0.024 | 0.022 | 0.021 | 0.023 | 0.020 | 0.021 | 0.022 |
| C | 0.086 | 0.108 | 0.094 | 0.094 | 0.086 | 0.086 | 0.090 | 0.081 | 0.085 | 0.087 |
| Vitrification | ○ | ○ | ○ | ○ | ○ | ○ | ○ | ○ | ○ | ○ |
| Tg [° C.] | 236 | 263 | 210 | 205 | 245 | 249 | 256 | 147 | 176 | 250 |
| $\lambda_{T10\%}$ [nm] | 12.2 | 12.2 | 12.0 | 12.3 | 12.2 | 12.4 | 14.4 | 18.5 | 18.2 | 12.2 |
| Visible light transmitting property | $T_H$ | $T_H$ | $T_L$ | $T_L$ | $T_H$ | $T_L$ | $T_L$ | $T_L$ | $T_L$ | $T_H$ |

TABLE 2

| | Ex 11 | Ex 12 | Ex 13 | Ex 14 | Ex 15 | Ex 16 | Ex 17 | Ex 18 | Ex 19 | Ex 20 |
|---|---|---|---|---|---|---|---|---|---|---|
| Ga | 0.0 | 1.0 | 3.0 | 3.0 | 10.0 | 0.0 | 0.0 | 6.0 | 6.0 | 7.0 |
| Ge | 20.0 | 12.0 | 7.0 | 5.0 | 0.0 | 18.0 | 18.0 | 0.0 | 0.0 | 0.0 |
| Sb | 7.0 | 15.0 | 24.9 | 24.9 | 20.0 | 18.0 | 18.0 | 23.9 | 22.0 | 25.9 |
| Bi | 3.0 | 0.0 | 0.0 | 0.0 | 0.0 | 0.0 | 0.0 | 0.0 | 0.0 | 0.0 |
| In | 0.0 | 0.0 | 0.0 | 0.0 | 0.0 | 0.0 | 0.0 | 0.0 | 0.0 | 0.0 |
| Zn | 0.0 | 0.0 | 0.0 | 0.0 | 0.0 | 0.0 | 0.0 | 0.0 | 0.0 | 0.0 |
| Sn | 0.0 | 0.0 | 0.0 | 2.0 | 5.0 | 0.0 | 0.0 | 4.0 | 4.0 | 2.0 |
| Si | 0.0 | 0.0 | 0.0 | 0.0 | 0.0 | 0.0 | 0.0 | 0.0 | 2.0 | 0.0 |
| La | 0.0 | 0.0 | 0.0 | 0.0 | 0.0 | 0.0 | 0.0 | 0.0 | 0.0 | 0.0 |
| Y | 0.0 | 0.0 | 0.0 | 0.0 | 0.0 | 0.0 | 0.0 | 0.0 | 0.0 | 0.0 |
| Gd | 0.0 | 0.0 | 0.0 | 0.0 | 0.0 | 0.0 | 0.0 | 0.0 | 0.0 | 0.0 |
| Ca | 0.0 | 0.0 | 0.0 | 0.0 | 0.0 | 0.0 | 0.0 | 0.0 | 0.0 | 0.0 |
| Sr | 0.0 | 0.0 | 0.0 | 0.0 | 0.0 | 0.0 | 0.0 | 0.0 | 0.0 | 0.0 |
| Ba | 0.0 | 0.0 | 0.0 | 0.0 | 0.0 | 0.0 | 0.0 | 0.0 | 0.0 | 0.0 |

TABLE 2-continued

| | Ex 11 | Ex 12 | Ex 13 | Ex 14 | Ex 15 | Ex 16 | Ex 17 | Ex 18 | Ex 19 | Ex 20 |
|---|---|---|---|---|---|---|---|---|---|---|
| Li | 0.0 | 0.0 | 0.0 | 0.0 | 0.0 | 0.0 | 0.0 | 0.0 | 0.0 | 0.0 |
| Na | 0.0 | 0.0 | 0.0 | 0.0 | 0.0 | 0.0 | 0.0 | 0.0 | 0.0 | 0.0 |
| K | 0.0 | 0.0 | 0.0 | 0.0 | 0.0 | 0.0 | 0.0 | 0.0 | 0.0 | 0.0 |
| Cs | 0.0 | 5.0 | 0.0 | 0.0 | 2.5 | 0.0 | 0.0 | 2.0 | 2.0 | 1.5 |
| S | 69.9 | 61.9 | 64.9 | 64.8 | 59.9 | 63.9 | 63.9 | 61.9 | 61.9 | 61.9 |
| Se | 0.0 | 0.0 | 0.0 | 0.0 | 0.0 | 0.0 | 0.0 | 0.0 | 0.0 | 0.0 |
| Te | 0.0 | 0.0 | 0.0 | 0.0 | 0.0 | 0.0 | 0.0 | 0.0 | 0.0 | 0.0 |
| F | 0.0 | 0.0 | 0.0 | 0.0 | 0.0 | 0.0 | 0.0 | 0.0 | 0.0 | 0.0 |
| CI | 0.0 | 5.0 | 0.0 | 0.0 | 2.5 | 0.0 | 0.0 | 2.0 | 2.0 | 1.5 |
| Br | 0.0 | 0.0 | 0.0 | 0.0 | 0.0 | 0.0 | 0.0 | 0.0 | 0.0 | 0.0 |
| I | 0.0 | 0.0 | 0.0 | 0.0 | 0.0 | 0.0 | 0.0 | 0.0 | 0.0 | 0.0 |
| Ti | 0.022 | 0.104 | 0.122 | 0.124 | 0.099 | 0.116 | 0.116 | 0.128 | 0.124 | 0.128 |
| C | 0.086 | 0.083 | 0.097 | 0.120 | 0.095 | 0.000 | 0.092 | 0.102 | 0.099 | 0.102 |
| Vitrification | ○ | ○ | ○ | ○ | ○ | ○ | ○ | ○ | ○ | ○ |
| Tg [° C.] | 276 | 269 | 236 | 233 | 214 | 274 | 276 | 229 | 228 | 227 |
| $\lambda_{T10\%}$ [nm] | 12.1 | 12.7 | 14.2 | 14.2 | 14.4 | 12.2 | 12.2 | 14.1 | 13.9 | 14.0 |
| Visible light transmitting property | $T_L$ | $T_L$ | $T_H$ | $T_L$ | $T_L$ | $T_H$ | $T_H$ | $T_L$ | $T_L$ | $T_L$ |

TABLE 3

| | Ex 21 | Ex 22 | Ex 23 | Ex 24 | Ex 25 | Ex 26 | Ex 27 | Ex 28 | Ex 29 | Ex 30 |
|---|---|---|---|---|---|---|---|---|---|---|
| Ga | 6.5 | 0.0 | 0.0 | 0.0 | 2.0 | 8.0 | 0.0 | 0.0 | 0.0 | 0.0 |
| Ge | 0.0 | 17.9 | 21.9 | 10.0 | 15.9 | 10.0 | 17.9 | 17.9 | 14.0 | 14.0 |
| Sb | 24.0 | 17.9 | 14.0 | 25.9 | 17.9 | 17.9 | 17.9 | 17.9 | 17.9 | 17.9 |
| Bi | 0.0 | 0.0 | 0.0 | 0.0 | 0.0 | 0.0 | 0.0 | 0.0 | 0.0 | 0.0 |
| In | 0.0 | 0.0 | 0.0 | 0.0 | 0.0 | 0.0 | 0.0 | 0.0 | 0.0 | 0.0 |
| Zn | 0.0 | 0.0 | 0.0 | 0.0 | 0.0 | 0.0 | 0.0 | 0.0 | 4.0 | 0.0 |
| Sn | 1.8 | 0.0 | 0.0 | 0.0 | 0.0 | 0.0 | 0.0 | 0.0 | 0.0 | 4.0 |
| Si | 0.0 | 0.0 | 0.0 | 0.0 | 0.0 | 0.0 | 0.0 | 0.0 | 0.0 | 0.0 |
| La | 1.8 | 0.0 | 0.0 | 0.0 | 0.0 | 0.0 | 0.0 | 0.0 | 0.0 | 0.0 |
| Y | 0.0 | 0.0 | 0.0 | 0.0 | 0.0 | 0.0 | 0.0 | 0.0 | 0.0 | 0.0 |
| Gd | 0.0 | 0.0 | 0.0 | 0.0 | 0.0 | 0.0 | 0.0 | 0.0 | 0.0 | 0.0 |
| Ca | 0.0 | 0.0 | 0.0 | 0.0 | 0.0 | 0.0 | 0.0 | 0.0 | 0.0 | 0.0 |
| Sr | 0.0 | 0.0 | 0.0 | 0.0 | 0.0 | 0.0 | 0.0 | 0.0 | 0.0 | 0.0 |
| Ba | 0.0 | 0.0 | 0.0 | 0.0 | 0.0 | 0.0 | 0.0 | 0.0 | 0.0 | 0.0 |
| Li | 0.0 | 0.0 | 0.0 | 0.0 | 0.0 | 0.0 | 0.0 | 0.0 | 0.0 | 0.0 |
| Na | 0.0 | 0.0 | 0.0 | 0.0 | 0.0 | 0.0 | 0.0 | 0.0 | 0.0 | 0.0 |
| K | 0.0 | 0.0 | 0.0 | 0.0 | 0.0 | 0.0 | 0.0 | 0.0 | 0.0 | 0.0 |
| Cs | 1.4 | 0.0 | 0.0 | 0.0 | 0.0 | 0.0 | 0.0 | 0.0 | 0.0 | 0.0 |
| S | 57.3 | 0.0 | 0.0 | 0.0 | 0.0 | 0.0 | 0.0 | 0.0 | 0.0 | 0.0 |
| Se | 0.0 | 63.8 | 63.8 | 63.8 | 63.8 | 63.8 | 58.8 | 48.8 | 63.8 | 63.8 |
| Te | 0.0 | 0.0 | 0.0 | 0.0 | 0.0 | 0.0 | 5.0 | 14.9 | 0.0 | 0.0 |
| F | 5.5 | 0.0 | 0.0 | 0.0 | 0.0 | 0.0 | 0.0 | 0.0 | 0.0 | 0.0 |
| Cl | 1.4 | 0.0 | 0.0 | 0.0 | 0.0 | 0.0 | 0.0 | 0.0 | 0.0 | 0.0 |
| Br | 0.0 | 0.0 | 0.0 | 0.0 | 0.0 | 0.0 | 0.0 | 0.0 | 0.0 | 0.0 |
| I | 0.0 | 0.0 | 0.0 | 0.0 | 0.0 | 0.0 | 0.0 | 0.0 | 0.0 | 0.0 |
| Ti | 0.122 | 0.178 | 0.174 | 0.186 | 0.178 | 0.178 | 0.183 | 0.193 | 0.178 | 0.182 |
| C | 0.098 | 0.142 | 0.139 | 0.148 | 0.142 | 0.142 | 0.146 | 0.154 | 0.141 | 0.145 |
| Vitrification | ○ | ○ | ○ | ○ | ○ | ○ | ○ | ○ | ○ | ○ |
| Tg [° C.] | 226 | — | — | — | — | — | — | — | — | — |
| $\lambda_{T10\%}$ [nm] | 14.0 | 19.9 | 19.7 | 23.1 | 20.1 | 22.5 | 20.1 | 23.7 | 20.0 | 20.0 |
| Visible light transmitting property | $T_L$ | $T_L$ | $T_L$ | $T_L$ | $T_L$ | $T_L$ | $T_L$ | $T_L$ | $T_L$ | $T_L$ |

TABLE 4

| | Ex 31 | Ex 32 | Ex 33 | Ex 34 | Ex 35 | Ex 36 | Ex 37 |
|---|---|---|---|---|---|---|---|
| Ga | 0.0 | 0.0 | 3.0 | 0.0 | 0.0 | 0.0 | 0.0 |
| Ge | 18.0 | 18.0 | 12.0 | 18.0 | 35.0 | 17.8 | 5.0 |
| Sb | 18.0 | 18.0 | 15.0 | 18.0 | 5.0 | 17.8 | 35.0 |
| Bi | 0.0 | 0.0 | 0.0 | 0.0 | 0.0 | 0.0 | 0.0 |
| In | 0.0 | 0.0 | 0.0 | 0.0 | 0.0 | 0.0 | 0.0 |
| Zn | 0.0 | 0.0 | 0.0 | 0.0 | 0.0 | 0.0 | 0.0 |
| Sn | 0.0 | 0.0 | 0.0 | 0.0 | 0.0 | 0.0 | 0.0 |
| Si | 0.0 | 0.0 | 0.0 | 0.0 | 0.0 | 0.0 | 0.0 |
| La | 0.0 | 0.0 | 0.0 | 0.0 | 0.0 | 0.0 | 0.0 |

TABLE 4-continued

| | Ex 31 | Ex 32 | Ex 33 | Ex 34 | Ex 35 | Ex 36 | Ex 37 |
|---|---|---|---|---|---|---|---|
| Y | 0.0 | 0.0 | 0.0 | 0.0 | 0.0 | 0.0 | 0.0 |
| Gd | 0.0 | 0.0 | 0.0 | 0.0 | 0.0 | 0.0 | 0.0 |
| Ca | 0.0 | 0.0 | 0.0 | 0.0 | 0.0 | 0.0 | 0.0 |
| Sr | 0.0 | 0.0 | 0.0 | 0.0 | 0.0 | 0.0 | 0.0 |
| Ba | 0.0 | 0.0 | 0.0 | 0.0 | 0.0 | 0.0 | 0.0 |
| Li | 0.0 | 0.0 | 0.0 | 0.0 | 0.0 | 0.0 | 0.0 |
| Na | 0.0 | 0.0 | 0.0 | 0.0 | 0.0 | 0.0 | 0.0 |
| K | 0.0 | 0.0 | 0.0 | 0.0 | 0.0 | 0.0 | 0.0 |
| Cs | 0.0 | 0.0 | 0.0 | 0.0 | 0.0 | 0.0 | 0.0 |
| S | 64.0 | 63.9 | 64.9 | 0.0 | 59.9 | 63.2 | 59.9 |
| Se | 0.0 | 0.0 | 0.0 | 64.0 | 0.0 | 0.0 | 0.0 |
| Te | 0.0 | 0.0 | 5.0 | 0.0 | 0.0 | 0.0 | 0.0 |
| F | 0.0 | 0.0 | 0.0 | 0.0 | 0.0 | 0.0 | 0.0 |
| Cl | 0.0 | 0.0 | 0.0 | 0.0 | 0.0 | 0.0 | 0.0 |
| Br | 0.0 | 0.0 | 0.0 | 0.0 | 0.0 | 0.0 | 0.0 |
| I | 0.0 | 0.0 | 0.0 | 0.0 | 0.0 | 0.0 | 0.0 |
| Ti | 0.000 | 0.000 | 0.000 | 0.000 | 0.021 | 1.160 | 0.027 |
| C | 0.000 | 0.231 | 0.094 | 0.000 | 0.085 | 0.092 | 0.109 |
| Vitrification | ○ | ○ | ○ | ○ | ○ | x | x |
| Tg [° C.] | 265 | 274 | 206 | — | 361 | — | — |
| $\lambda_{T10\%}$ [nm] | 11.3 | 11.7 | 11.7 | 11.7 | 11.3 | — | — |
| Visible light transmitting property | $T_H$ | $T_H$ | $T_L$ | $T_L$ | $T_L$ | — | — |

As can be seen from Table 1 to Table 3, the glass in each of Examples 1 to 30 which contains 6% to 30% of Ge+Ga, 50% to 85% of S+Se+Te, and 0.001% to 0.5% of Ti is favorably vitrified. In the glass in each of Examples 1 to 30, similarly to the infrared spectrums of the glass in Example 16 and Example 17 illustrated in the following FIG. 1, any of the infrared spectrums in the plate-shaped bodies with a thickness of 1 mm has a transmittance characteristic in which good transmittance is kept substantially uniform in a predetermined wavelength region of 8 μm or more and the transmittance drops steeply on a long wavelength side. Then, the glass in each of Examples 1 to 30 is the glass in which a wavelength at a long-wavelength side end in which transmittance becomes 10% ($\lambda_{T10\%}$) is 12 μm or more. Therefore, the glass in each of Examples 1 to 30 is the glass having a good light-transmitting property in an infrared region of 8 to 12 μm which is particularly important as a visibility range of a far-infrared camera or the like. In addition, the glass in each of Examples 1 to 21 does not contain components having an environmental load, is low in the environmental load, in addition, has Tg of 140° C. to 550° C., and is good in moldability. Note that Tg in each of Examples 22 to 30 is presumed to be in a range of 200 to 350° C.

Furthermore, it is found from a graph in FIG. 1 that in the glass in Example 17, compared with the glass in Example 16, absorption caused by hydrogen and oxygen is not seen in an infrared region and an infrared spectrum is flat, resulting in having a better infrared transmission property.

On the other hand, as can be seen from Table 4, in the glass in each of Examples 31 to 34, Ti is not contained and $\lambda_{T10\%}$ is less than 12 μm, resulting in that a light-transmitting property in the infrared region of 8 to 12 μm is insufficient. In addition, as can be seen from FIG. 1, in the glass in each of Example 31 and Example 32, compared with the glass in each of Examples 16 and 17 having the same matrix composition of the glass other than a content ratio of each of Ti and C, absorption of infrared rays caused by oxygen and hydrogen is seen, and the glass in Example 32 containing C has a better light-transmitting property in the above-described infrared region than that of the glass in Example 31 not containing C, but its transmitting property is not equal to that of the glass in each of Examples 16 and 17.

Further, in the glass in Example 35 in which Ge+Ga exceeds 30%, Ti and C are added thereto, but infrared absorption caused by a stretching vibration of bonding of Ge—O is not suppressed sufficiently by Ti and C, and $\lambda_{T10\%}$ becomes less than 12 μm.

Furthermore, it is found that neither the glass in Example 36 in which a content ratio of Ti exceeds 0.5% nor the glass in Example 37 in which Ge+Ga is less than 6% is vitrified.

According to the present invention, it is possible to obtain an optical glass which has high light transmittance in a near-infrared to far-infrared region, further preferably even in a visible region, in addition, does not contain As having an environmental load and in which an adverse effect on environmental aspects is restrained to a minimum. Therefore, the optical glass of the present invention is useful as optical devices such as an optical filter, an optical window, a lens, and a polarizing element which are used in a wide infrared wavelength band, and is particularly suitable as an on-vehicle nightvision and a thermoviewer.

What is claimed is:

1. An optical glass comprising, in expression of atomic %: Ge+Ga; 6% to 30%; S+Se+Te; 50% to 85%; and Ti; 0.001% to 0.5%, wherein a wavelength ($\lambda_{T10\%}$) at a long-wavelength side end which infrared transmittance through a glass plate converted to a thickness of 1 mm based on the optical glass becomes 10% is 12 μm or more.

2. The optical glass according to claim 1, substantially not comprising As.

3. The optical glass according to claim 1, comprising, in expression of atomic %:

Ge+Ga; 7% to 25%;
Sb; 0% to 35%;
Bi; 0% to 20%;
Zn; 0% to 20%;
Sn; 0% to 20%;
Si; 0% to 20%;
La; 0% to 20%;
S+Se+Te; 55% to 80%;
Ti; 0.005% to 0.3%;

Li+Na+K+Cs; 0% to 20%; and

F+Cl+Br+I; 0% to 20%, wherein a glass transition point (Tg) of the optical glass is 140° C. to 550° C.

4. The optical glass according to claim 1, comprising, in expression of atomic %:

Ge+Ga; 7% to 25%;

Sb; 0% to 35%;

Bi; 0% to 20%;

In; 0% to 20%;

Zn; 0% to 20%;

Sn; 0% to 20%;

Si; 0% to 20%;

La; 0% to 20%;

Y; 0% to 10%;

Gd; 0% to 10%;

Ca; 0% to 20%;

Sr; 0% to 20%;

Ba; 0% to 20%;

S+Se+Te; 55% to 80%;

Ti; 0.005% to 0.3%;

Li+Na+K+Cs; 0% to 20%; and

F+Cl+Br+I; 0% to 20%, wherein a glass transition point (Tg) of the optical glass is 140° C. to 550° C.

5. The optical glass according to claim 1, substantially not comprising Se.

6. The optical glass according to claim 1, comprising, in expression of atomic %:

Ge+Ga; 8% to 23%;

Sb; 2% to 32%;

Bi; 0% to 10%;

In; 0% to 10%;

Zn; 0% to 15%;

Sn; 0% to 15%;

Si; 0% to 15%;

La; 0% to 15%;

Y; 0% to 8%;

Gd; 0% to 8%;

Ca; 0% to 15%;

Sr; 0% to 15%;

Ba; 0% to 15%;

S; 55% to 75%;

Te; 0% to 20%;

S+Te; 55% to 75%;

Ti; 0.01% to 0.2%;

Li+Na+K+Cs; 0% to 10%; and

F+Cl+Br+I; 0% to 10%, and comprising

C; 0.001% to 0.2%.

7. An optical device using the optical glass according to claim 1.

8. An infrared sensor having the optical device according to claim 7.

* * * * *